United States Patent [19]
Yasui

[11] Patent Number: 4,769,713
[45] Date of Patent: Sep. 6, 1988

[54] METHOD AND APPARATUS FOR MULTI-GRADATION DISPLAY

[75] Inventor: Masaru Yasui, Yao, Japan

[73] Assignee: Hosiden Electronics Co. Ltd., Osaka, Japan

[21] Appl. No.: 19,287

[22] Filed: Feb. 26, 1987

[30] Foreign Application Priority Data

Jul. 30, 1986 [JP] Japan ................. 61-179576

[51] Int. Cl.$^4$ .................. H04N 5/74; H04N 1/40
[52] U.S. Cl. .................. 358/236; 358/283; 340/793
[58] Field of Search .................. 358/236, 241, 283; 340/793

[56] References Cited

U.S. PATENT DOCUMENTS

| | | | |
|---|---|---|---|
| 3,906,290 | 9/1975 | Kurahashi et al. | 340/793 X |
| 4,158,200 | 6/1979 | Seitz et al. | 340/793 X |
| 4,340,889 | 7/1982 | Knight et al. | 340/793 |
| 4,361,850 | 11/1982 | Nishimura | 340/793 X |
| 4,367,464 | 1/1983 | Kurahashi et al. | 340/793 X |
| 4,383,256 | 5/1983 | Kurahashi et al. | 340/793 |
| 4,438,453 | 3/1984 | Alston | 340/793 X |
| 4,473,849 | 9/1984 | Cool | 358/32 X |
| 4,559,535 | 12/1985 | Watkins et al. | 340/793 |
| 4,736,254 | 4/1988 | Kotera et al. | 358/283 |
| 4,737,782 | 4/1988 | Fukuma et al. | 340/793 X |

Primary Examiner—James J. Groody
Assistant Examiner—E. Anne Faris
Attorney, Agent, or Firm—Pollock, Vande Sande and Priddy

[57] ABSTRACT

In a multi-gradation display method and apparatus by which a display signal formed by a picture element signal of any one of the levels of N gradations (where N is an integer equal to or greater than 3) is displayed on a display panel in which each picture element produces a two-gradation display, one frame is composed of (N−1) fields, and accordingly each picture element is supplied with a binary signal (N−1) times for each frame, and the binary signal is given one of its values by a number of times corresponding to the level value of the input picture element signal and the other value by the remaining number of times.

3 Claims, 5 Drawing Sheets

FIG. 6

| R | G | B | |
|---|---|---|---|
| 0 | 0 | 0 | BLACK |
| 0 | 0 | 1 | |
| 0 | 0 | 2 | BLUE |
| 0 | 1 | 0 | |
| 0 | 1 | 1 | |
| 0 | 1 | 2 | |
| 0 | 2 | 0 | GREEN |
| 0 | 2 | 1 | |
| 0 | 2 | 2 | CYAN |
| 1 | 0 | 0 | |
| 1 | 0 | 1 | |
| 1 | 0 | 2 | |
| 1 | 1 | 0 | |
| 1 | 1 | 1 | GRAY |
| 1 | 1 | 2 | |
| 1 | 2 | 0 | |
| 1 | 2 | 1 | |
| 1 | 2 | 2 | |
| 2 | 0 | 0 | RED |
| 2 | 0 | 1 | |
| 2 | 0 | 2 | MAGENTA |
| 2 | 1 | 0 | |
| 2 | 1 | 1 | |
| 2 | 1 | 2 | |
| 2 | 2 | 0 | YELLOW |
| 2 | 2 | 1 | |
| 2 | 2 | 2 | WHITE |

METHOD AND APPARATUS FOR MULTI-GRADATION DISPLAY

BACKGROUND OF THE INVENTION

The present invention relates to a method and an apparatus which enable a multi-gradation display with three or more gradations through use of, for example, a liquid crystal display panel in which each picture element is capable of producing a display with only two gradations.

For providing a multi-gradation display on a liquid crystal display, it is customary in the prior art to employ an arrangement in which an analog picture element signal is supplied from the source side of a thin film transistor to each picture element electrode (a drain electrode) for driving it. The liquid crystal display is usually what is called a row scan type in which picture element electrodes are arranged in a matrix form and are driven row by row for display. In order to display an analog display signal such as a TV signal on the row scan type display, it is necessary to hold each picture element signal in an analog sample hold circuit for each horizontal scanning line of the input TV signal.

On the other hand, a binary (two-gradation) image signal can be displayed on the row scan type display by the employment of a simple arrangement in which the binary image signals of one horizontal scanning line are applied in serial to a shift register and the contents of respective stages of the shift register are provided in parallel for simultaneously driving respective column drive lines of the display (source buses in the case of the liquid crystal display). Accordingly, the signal processing is digital, and hence is very simple. In the past, however, there have not been provided any method and apparatus by which multi-gradation image signals are displayed with three or more gradations on the two-gradation display panel through digital processing.

SUMMARY OF THE INVENTION

It is therefore an object of the present invention to provide a method and an apparatus which permit a multi-gradation display through digital processing i.e., through binary display driving.

According to the method of the present invention, each picture element signal indicating any one of N (where N is a fixed integer equal to or greater than 3) gradations is supplied as a display signal to a display panel in which each picture element provides a two-gradation display. A display of one frame is produced by applying a binary signal to each picture element of the display panel $(N-1)$ times. The binary signal is given one of the two values a number of times corresponding to the level of the input picture element signal, out of $(N-1)$ times, thereby producing an N-gradation display. That is, when the level of the input picture element signal is P (where P=0, 1, 2, ... N−1), the binary signal is made a "1" P out of $(N-1)$ times and a "0" $(N-1-P)$ times. Such a binary signal can be obtained with an arrangement in which picture signals of one frame is stored in a memory, the memory is read out $(N-1)$ times, a field counter is caused to count up by one for each readout of the memory, the count value of the field counter and the value (the level) of each readout picture element signal are compared, and a "1" or "0" is provided depending upon whether the picture element signal value is greater than or smaller than or equal to the count value.

According to the multi-gradation display apparatus of the present invention, each frame is composed of $1 \times n$ picture element signals each having M bits (where $2^M$ is greater than or equal to N) indicating any one of N gradations, and those picture element signals are stored as display signals in a frame memory. On the other hand, a dot clock from a dot clock generator is counted by a readout address counter, whose count value is supplied as an address to the frame memory to read it out for each picture element signal. The dot clock is frequency divided by a picture element counter down to 1/n of the dot clock frequency to obtain a row clock, which is, in turn, frequency divided by a row counter down to 1/l of the row clock frequency, obtaining a field clock. The field clock is counted by a field counter and, at the same time, it is applied to the address counter to reset it. The count value CN of the field counter and the level value P of the picture element signal read out from the frame memory are compared by an M-bit comparator, which outputs a binary signal of one of the two logic states when CN>P and a binary signal of the other logic state when $CN \leq P$. The binary signals from the M-bit comparator are successively fed into a dot shift register in synchronism with the dot clock. The contents of the dot shift register are latched by the row clock in a column latch/drive circuit. The n outputs from the column latch/drive circuit are respectively applied to n column drive lines of a display panel composed of l by n picture elements. The field clock from the row counter is fed into a row shift register/drive circuit and then shifted therethrough in synchronism with the row clocks. The l output lines of the row shift register/drive circuit are connected to l row drive lines of the display panel.

Thus, each frame signal is supplied, as $(N-1)$ fields of binary display signals, to the display panel. At this time, each picture element is activated with one of the two logic values from the M-bit comparator for a number of fields, out of $(N-1)$ fields, corresponding to the level value of the picture element signal. Thus the appearance of an N-gradation display is produced.

BRIEF DESCRIPTION OF THE DRAWINGS

FIG. 6 is a diagram showing, by way of example, the relationships between colors which can be displayed by the apparatus of FIG. 5 and color signals.

DESCRIPTION OF THE PREFERRED EMBODIMENTS

Figure 1:
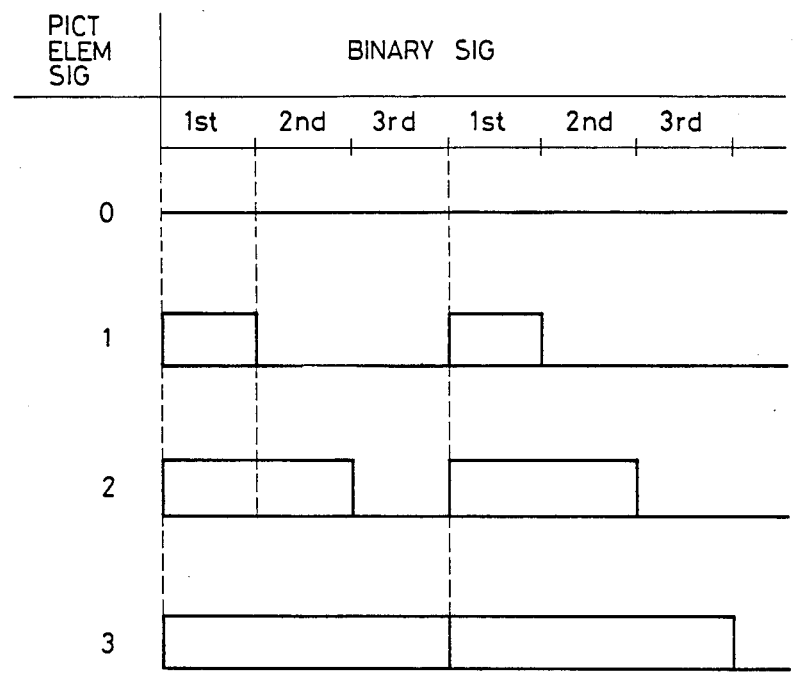
FIG. 1 is a diagram showing, by way of example, the relationship between the level of a picture element signal and its converted binary signal.

Referring first to FIG. 1, the principles of the present invention will be described as being applied to a four-gradation display (N=4) through use of a binary signal.

The picture element signal can assume any of levels 0, 1, 2 and 3, and the corresponding picture element of the display panel is driven by the binary signal three times (N−1=3). When the picture element signal has the level 0, the binary signal is a "0" all three times; when the picture element signal is at the level 1, the binary signal is a "1" only once; when the picture element signal is at the level 2, the binary signal is a "1" only twice; and when the picture element signal is at the level 3, the binary signal is a "1" all three times. By repeating such driving at a high speed as compared with the time of visual persistance, a four-gradation display in black, dark gray, light gray and white can be provided.

Figure 2:
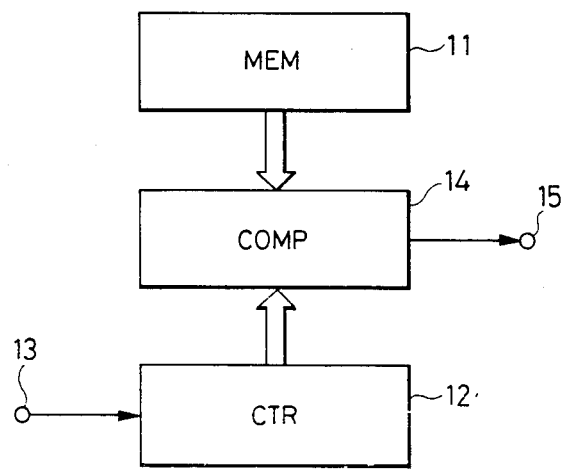
FIG. 2 is a block diagram showing an example of the basic arrangement for performing the conversion depicted in FIG. 1.

Such a binary signal is obtained through use of such an arrangement as shown in FIG. 2. The level value of the picture element signal is set in a memory 11, clock pulses from a terminal 13 are counted by a modulo-4 counter 12, and its count value and the level value stored in the memory 11 are compared by a comparator 14, which provides an output "1" or "0" to an output terminal 15 depending upon whether the count value is greater than or equal to or smaller than the level value. In this way, the binary signal is obtained at the output terminal 15.

Figure 3:
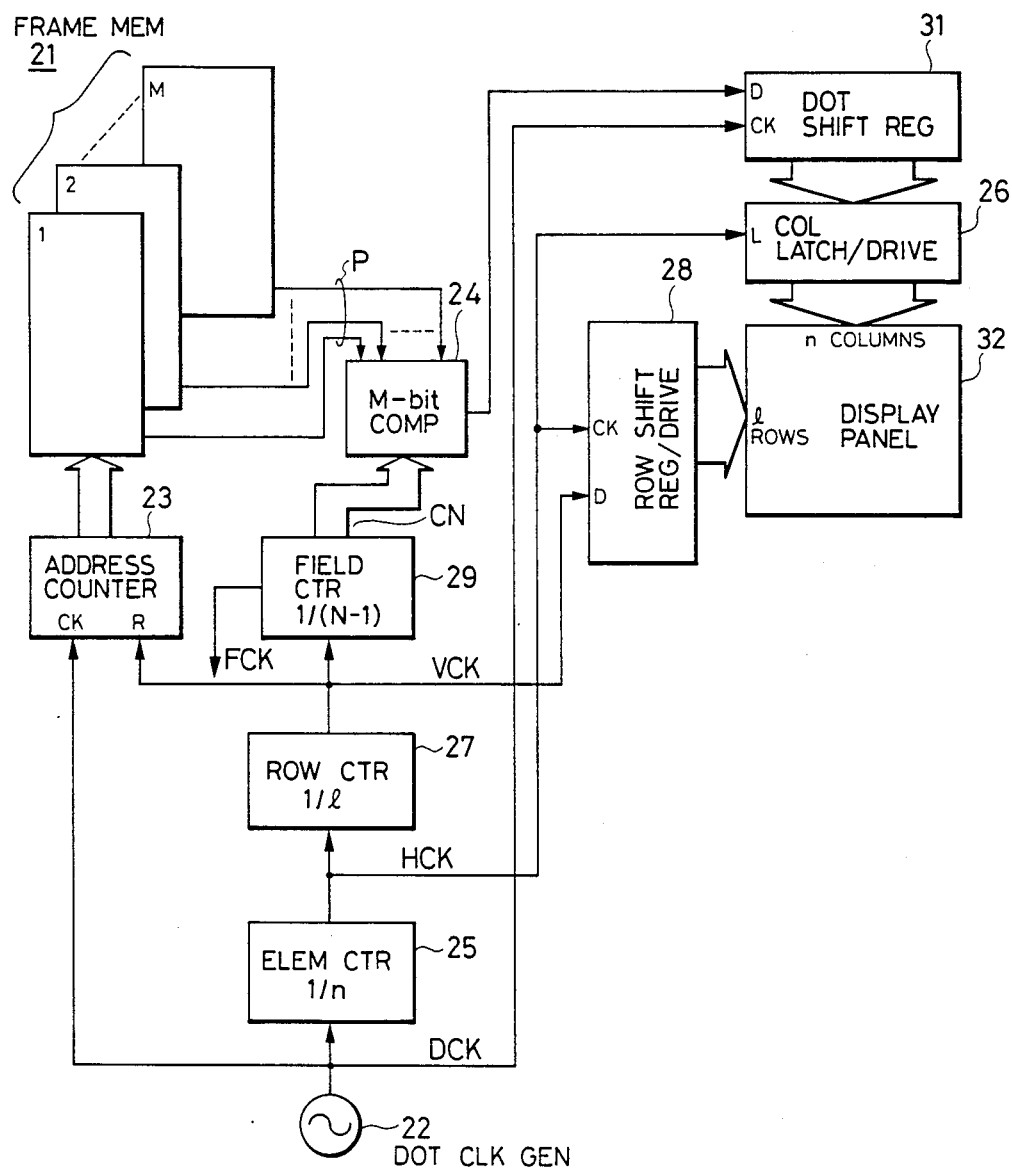
FIG. 3 is a block diagram illustrating an example of the multi-gradation display apparatus of the present invention.

Next, a description will be given, with reference to FIG. 3, of a specific example of the method for providing a multi-gradation display according to the present invention. In this example, a frame memory 21 comprises M memory planes, each composed of l by n bits (where l and n are integers greater than one), and each frame consists of l by n picture elements. Each picture element signal assumes any one of the values of N gradations (where $2^M \geq N$ and N is an integer equal to or greater than 3), and each picture element signal is stored in the frame memory 21, with each of its M bits assigned to one of the M memory planes.

A dot clock DCK from a dot clock generator 22 is counted by an address counter 23, the count value of which is used as an address for reading out a picture element signal of M bits simultaneously from the M memory planes of the frame memory 21, and the read-out picture element signal P is supplied to an M-bit comparator 24.

The dot clock DCK is frequency divided by a picture element counter 25 down to 1/n, and the row clock HCK, which is the frequency-divided output, is provided as a latch command to a column latch/drive circuit 26. At the same time, the row clock HCK is frequency divided by a row counter 27 down to 1/l, producing a field clock VCK. The field clock VCK is fed into a serial data input terminal of a row shift register/drive circuit 28 having l shift stages, and then shifted stage to stage in synchronization with the row clock HCK upon each occurrence of n dot clocks.

The address counter 23 is reset by the field clock VCK. The field clock VCK is counted and frequency divided by a field counter 29 down to 1/(N−1), yielding a frame clock FCK. The frame clock FCK is used to update the frame, and when the display panel is a liquid crystal display panel, it is used to reverse the polarity of a drive voltage for activating the liquid crystal.

The level P of each picture element signal read out of the frame memory 21 and the count value CN of the field counter 29 are compared by the M-bit comparator 24, which outputs a "1" for P>CN and a "0" for P≧CN, respectively. The binary signals from the comparator 24 are fed in serial to a data terminal D of a dot shift register 31 and shifted into the respective n stages of the shift register 31 under control of the dot clock DCK. Then, the contents of the shift register 31 are latched in parallel in the column latch/drive circuit 26 upon each occurrence of the row clock HCK. By n outputs from the column latch/drive circuit 26 n column drive lines of a display panel 32 with l rows and n columns are respectively driven, and one of its l row drive lines is selectively driven in accordance with the contents of the row shift register drive circuit 28. In other words, n picture elements connected to the selected one of row drive lines are driven in parallel by the n outputs from the column latch/drive circuit 26.

With such an arrangement, all the counters 23, 25, 27 and 29, the column latch/drive circuit 26, and the dot shift register 31 are initially reset, and a "1" is initially set in the initial stage of the row shift register/drive circuit 28. Then picture element signals on a first row of the frame are read out of the frame memory 21 in succession. Where the read-out values are, for example, "3", "2", "0", "1", . . ., as shown in FIG. 4A, these values are successively compared with the count value CN of the field counter 29, first with a "0" as depicted in FIG. 4B, in the comparator 24, which provides outputs "1", "1", "0", "1", . . . corresponding to the above-noted values 3, 2, 0, 1, . . ., as shown in FIG. 4C. These outputs are sequentially loaded in the dot shift register 31. Upon completion of the readout for the first row, the row clock HCK is generated by the picture element counter 25, by which the contents of the dot shift register 31 are latched in the column latch/drive circuit 26, and at the same time the "1" shifts to the first stage of the row shift register/drive circuit 28, with the result that n picture elements on the first row of the display panel 32 are respectively driven by binary signals.

Figure 4:
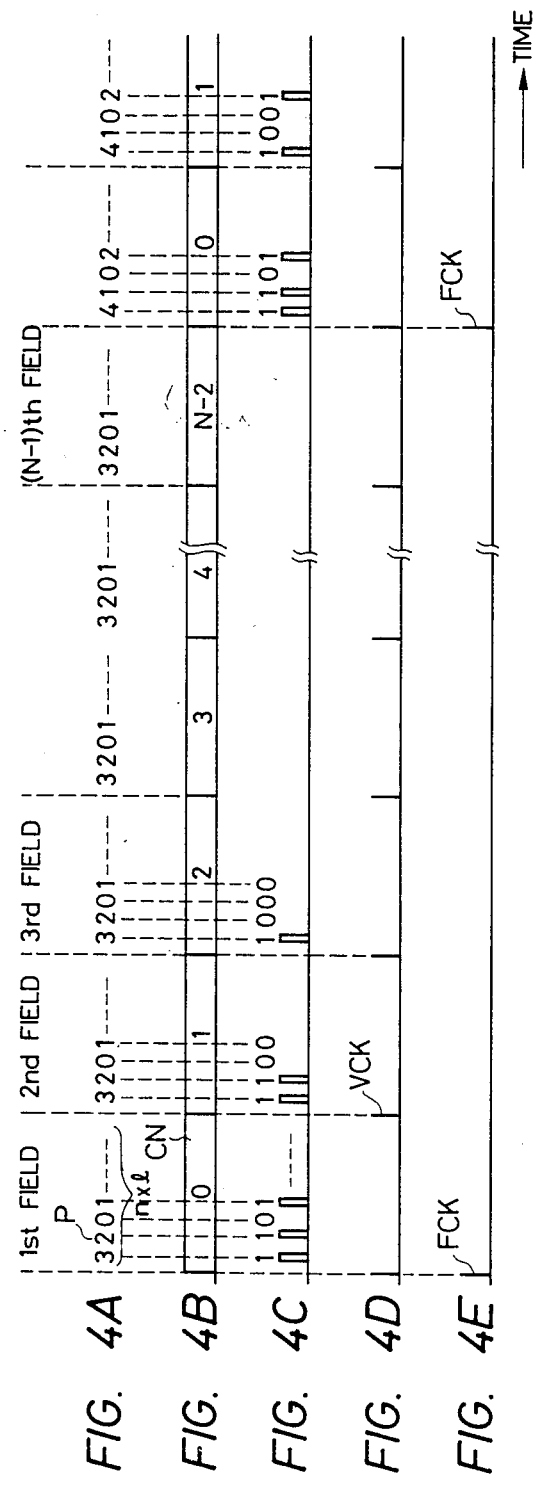
FIGS. 4A–4E is a timing chart for explaining the operation of the apparatus shown in FIG. 3.

In this way, each time picture element signals of one row are read out of the frame memory 21, the activation of the picture elements on the display panel 32 is shifted by one row. When the frame memory 21 has been read out for one frame, that is, when the display for the first field has been completed, the row counter 27 yields the field clock VCK, as depicted in FIG. 4, by which the address counter 23 is reset, and the same contents of the frame memory 21 is read out again, starting at picture element signals corresponding to those on the first row. Thus the display for the second field is initiated. At this time, the count value of the field counter 29 is a "1", with which are compared the picture element signals "3", "2", "0", "1", . . . read out of the frame memory 21. In consequence, the comparator 24 outputs binary signals "1", "1", "0", "0", . . ., as depicted in FIG. 4C, and they are displayed on the display panel 32.

Thereafter the frame memory 21 is repeatedly read out in the same manner as described above, and the display panel 32 is scanned row by row, providing a display. In the display of an (N−1)th field the count value of the field counter 29 is N−2, with which are compared the outputs P from the frame memory 21. At the end of the display of the (N−1)th field the display of one frame is completed, and the frame clock FCK is generated by the field counter 29, as shown in FIG. 4E, starting the display of the next frame with renewed picture element signal values 4, 1, 0, 2, . . . , for example.

As described above, each picture element is driven by binary signals (N−1) times. When the picture element signal value is P, the same picture element is driven by the binary signal "1" P times and by the binary signal "0" (N−1−P) times, thereby producing an N-gradation display. In order to prevent the display from flickering, the frequency of the frame clock FCK is selected to be 60 Hz, for instance. For updating the display of one frame, it is necessary only to employ two sets of frame memories and write in one of them display signals to be displayed next while the other is being read out.

Figure 5:
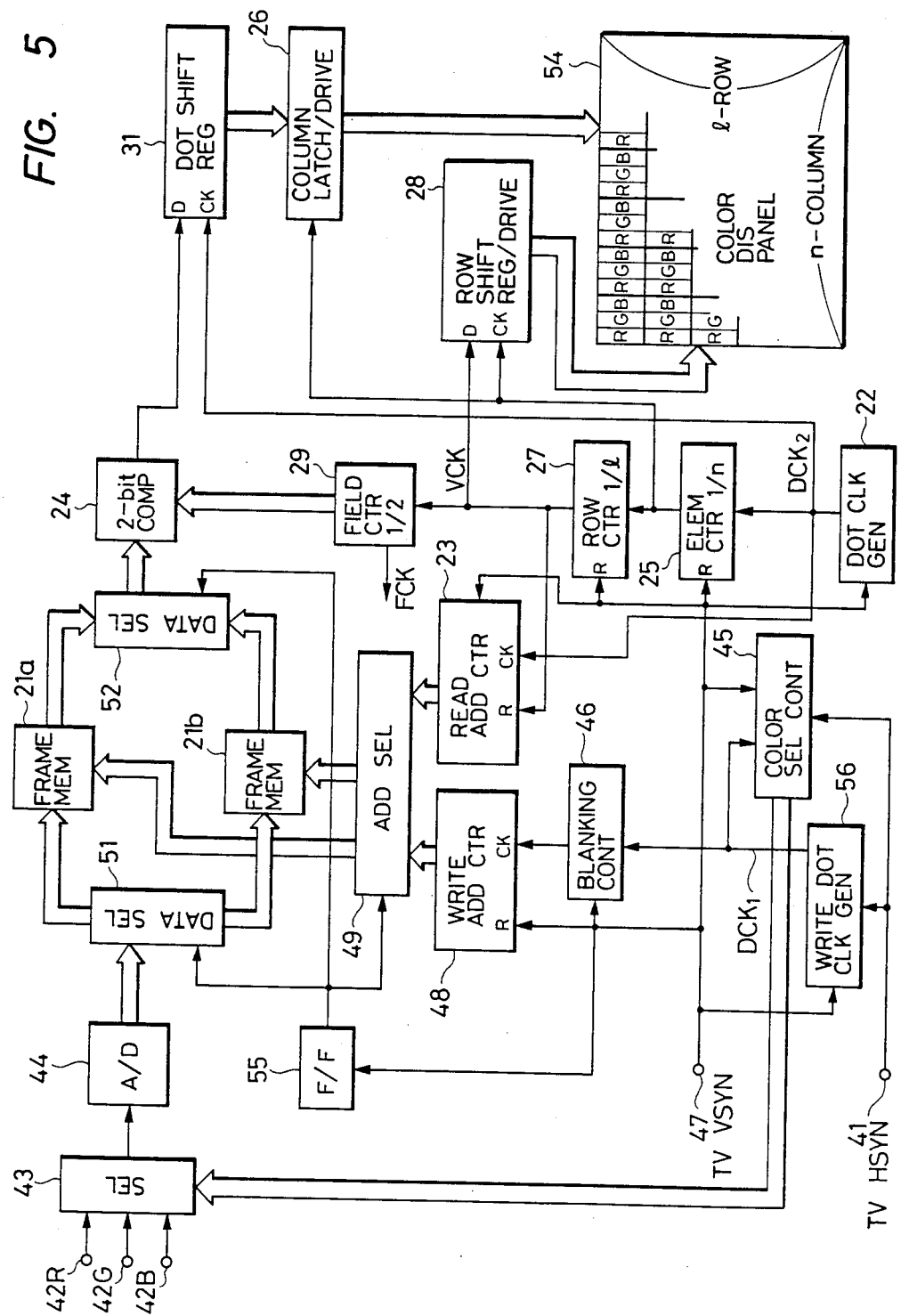
FIG. 5 is a block diagram illustrating an example of color multi-gradation display apparatus embodying the present invention.

For displaying a color display signal as a color image, a color display panel is employed in which every three picture elements constitute three color pixels having red, green and blue color filters, respectively. In the case of producing a color display in, for example, $3^3=27$ colors based on the three primary colors, it is necessary only to take such steps as described below. For instance, as illustrated in FIG. 5, the dot clock generator 22 is placed under synchronous control of a vertical synchronizing signal of a TV signal which is supplied from a terminal 47. Let it be assumed that red, green and blue color pixel signals constituting a color signal of the color TV signal are each given any one of the levels 0, 1 and 2, that is, N=3. Accordingly, the field counter 29 frequency divides the field clock VCK down to 1/(N−1) (i.e., ½), producing the frame clock FCK.

The respective picture element signals are written in one of frame memories 21a and 21b in the cyclical sequence red - green - blue. That is, the red, green and blue color pixel signals are applied simultaneously to input terminals 42R, 42G and 42B of a selector 43 which is formed by an analog switch, and they are repeatedly selected in succession and applied to an AD converter 44. A write dot clock $DCK_1$ is generated by a write dot clock generator 56 at a rate three times higher than the rate of the color signals in the TV signal, in synchronism with the TV horizontal and vertical synchronizing signals HSYN and VSYN from terminals 41 and 47 and supplied to a color select control circuit 45, from which a control signal is applied to the selector 43 to successively and repeatedly select the inputs from the terminals 42R, 42G and 42B.

In a blanking control circuit 46 the write dot clock $DCK_1$ is processed by the vertical synchronizing signal in the TV signal from the terminal 47 so that during the blanking period the dot clock $DCK_1$ is inhibited, thereby stopping the increment of address generation at a write address counter 48 during the blanking period. The output dot clock from the blanking control circuit 46 is counted by the write address counter 48 to produce the write addresses.

A write address created by the write address counter 48 is provided via an address selector 49 to either one of the frame memories 21a and 21b. In the AD converter 44 the input color pixel signals are converted into 2-bit digital values in accordance with their levels 0, 1 and 2 in this example, and then applied as write data to either one of the frame memories 21a and 21b via a data selector 51. The outputs read out of the frame memories 21a and 21b are selected by a data selector 52 for input into the 2-bit comparator 24.

The display dot clock $DCK_2$ from the dot clock generator 22 is frequency divided by the picture element counter 25 down to 1/n. The frequency-divided output is further frequency-divided by the row counter 27 down to 1/l and is then provided to the field counter 29, as in the case of FIG. 3. The readout address from the readout address counter 23 is supplied via the address selector 49 to that one of the frame memories 21a and 21b which is not being supplied with the write address. Upon each toggle of a flip-flop 55 on the vertical synchronizing signal, the address selector 49 and the data selectors 51 and 52 are switched between their operational states for selecting the frame memories 21a and 21b. When the data selector 51 is applying the AD converted output to the frame memory 21a, the address selector 49 supplies the write addresses to the frame memory 21a to put it in the write mode and at the same time provides the readout addresses to the frame memory 21b to put it in the read mode, and the data selector 52 supplies the comparator 24 with the output read out from the frame memory 21b.

Accordingly, the input TV signals are written in the frame memory 21a in the order red-green-blue for every three picture elements, starting at the left-hand end of the first row on the picture frame. At the same time, the frame memory 21b is read out and the red, green and blue color pixel signals are converted into binary signals for every three picture elements, starting at the left-hand end of the first row, and they are sequentially written in the dot shift register 31. When the picture element signals of one row have been read out from the frame memory 21b, the data in the dot shift register 31 is latched in the column latch/drive circuit 26. A color display panel 54 has an l by n matrix structure of picture elements every three of which are formed by color pixels with red, green and blue filters in a row. The red, green and blue color pixel signal outputs from the column latch/drive circuit 26 are provided to the color pixels on the row drive line selected by the row shift register/drive circuit 28. In this example, when the frame memory 21b has been read out twice, the frame clock FCK is yielded.

In this example the display is produced in 27 colors, as depicted in FIG. 6. The frame clock FCK has a frequency of, for instance, 60 Hz, as mentioned previously. Since the frame memories 21a, 21b are each read out two times during each frame period, the display dot clock $DCK_2$ has a frequency about two times higher than that of the write dot clock $DCK_1$.

As has been described above, according to the present invention, a multi-gradation display can be provided through use of a display panel which is driven by binary signals. This enables simple digital processing of display signals, and hence allows ease in the processing for display on the row scan type display panel. In the case of employing the digital comparator 24, as described previously, the frame memory needs only to have M bits (where $2^M$ greater than or equal to N) for each picture element in the case of an N-gradation display, and accordingly the memory capacity needed is small.

It will be apparent that many modifications and variations may be effected without departing from the scope of the novel concepts of the present invention.

what is claimed is:

1. A multi-gradation display apparatus for displaying a video signal composed of picture element signals comprising:

first and second frame memories each for storing l×n picture element signals, each of said picture element signals having M bits indicating any one of levels of N gradations, where $2^M \geq N$ and N is an integer greater than or equal to 3;

a first dot clock generator for generating a first dot clock in synchronism with the picture element signals;

a second dot clock generator for generating a second dot clock of a frequency about (N−1) times higher than the frequency of the first dot clock generated by said first dot clock generator;

a write address counter for counting the first dot clock from said first dot clock generator and producing count values as write addresses for said first and second frame memories;

a readout address counter for counting the second dot clock from said second dot clock generator and producing count values as read addresses for said first and second frame memories;

an address selector for applying the read addresses and the write addresses to said first and second frame memories, alternately, to read out picture element signals of one frame from one of said first and second frame memories while writing picture element signals of a subsequent frame into the other of said first and second frame memories, and vice versa;

a first selector for supplying each frame of picture element signals as write data to the one of said first and second frame memories which is being supplied with the write addresses;

a second selector for outputting each frame of picture element signals as readout data from the one of said first and second frame memories which is being supplied with the read addresses;

a selector control means for alternately switching selections by said address selector and said first and second selectors such that while said first selector selects one of said first and second frame memories to apply thereto a frame of picture element signals as write data, said second selector selects the other of said first and second frame memories to receive therefrom a frame of picture element signals as readout data N−1 times and said address selector provides the write addresses and the read addresses to the said one of and the said other of said first and second frame memories, respectively;

a picture element counter for frequency dividing the second dot clock from said second dot clock generator down to 1/nth frequency thereof to produce a row clock;

a row counter for frequency dividing the row clock from said picture element counter down to 1/lth frequency thereof to produce a field clock for input, as a reset signal, to said read address counter;

a field counter for counting the field clock from said row counter and producing a count value CN incrementing from zero to N−2 successively and repeatedly;

an M-bit comparator for comparing the count value CN from said field counter and a level value P of each picture element signal read out of said first and second frame memories via said second selector, said comparator being operative to produce a binary signal representing one of two logic values when CN>P and to produce a binary signal representing the other of the two logic values when CN≦P;

a dot shift register, having at least n stages, for successively receiving the outputs of said M-bit comparator as data inputs and shifting said data inputs through the n stages in synchronism with the second dot clock supplied from said second dot clock generator as a column shift clock;

a column latch/drive circuit for latching the contents of said dot shift register, simultaneously, upon occurrence of the row clock from said picture element counter;

a row shift register/drive circuit with at least l stages for receiving each field clock from said row counter as a data input thereto and shifting the data input through the l stages in synchronism with the row clock supplied from said picture element counter as a row shift clock; and a display panel in which picture elements are arranged in the from of a matrix with l rows and n columns, the picture elements of the n columns being respectively connected to n column drive lines which are connected to n outputs of said column latch/drive circuit, and the picture elements on the l rows being respectively connected to l row drive lines which are connected to l outputs of said row shift register/drive circuit, whereby the picture elements are each driven by input to said column and row drive lines connected thereto to provide a display.

2. The apparatus of claim 1 wherein the video signal is a color video signal, every three of the n outputs of said column latch/drive circuit corresponding to red, green and blue color pixel signals composing a color signal, and every three picture elements in each row of said display panel being formed by red, green and blue color pixels, said apparatus comprising:

a color select control means for generating a select control signal at a rate three times higher than the color signal; and a color selector for selectively supplying, in accordance with the select control signal, said red, green and blue color pixel signals to said first selector.

3. The apparatus of claim 1 wherein said display panel is a liquid crystal display panel.

* * * * *